(12) United States Patent
Spruck et al.

(10) Patent No.: US 7,307,792 B2
(45) Date of Patent: Dec. 11, 2007

(54) OBSERVATION SYSTEM AND METHOD

(75) Inventors: Bernd Spruck, Mogglingen (DE); Martin Edelmann, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 173 days.

(21) Appl. No.: 11/016,571

(22) Filed: Dec. 17, 2004

(65) Prior Publication Data
US 2005/0162748 A1   Jul. 28, 2005

(30) Foreign Application Priority Data
Dec. 18, 2003  (DE) ............... 103 59 691

(51) Int. Cl.
*G02B 27/14* (2006.01)
(52) U.S. Cl. ..................... 359/630; 359/629
(58) Field of Classification Search ............. 359/629, 359/630, 223, 385, 388
See application file for complete search history.

(56) References Cited

U.S. PATENT DOCUMENTS

| | | | |
|---|---|---|---|
| 5,483,307 A | 1/1996 | Anderson | |
| 5,805,119 A * | 9/1998 | Erskine et al. | 345/7 |
| 5,864,432 A | 1/1999 | Deter | |
| 6,813,085 B2 * | 11/2004 | Richards | 359/630 |
| 6,819,485 B2 | 11/2004 | Mannss | |
| 6,985,272 B2 * | 1/2006 | Bridgwater et al. | 359/237 |

FOREIGN PATENT DOCUMENTS

| | | |
|---|---|---|
| DE | 196 20 658 C1 | 7/1997 |
| EP | 0 547 493 A1 | 6/1993 |

* cited by examiner

*Primary Examiner*—Timothy Thompson
(74) *Attorney, Agent, or Firm*—Patterson, Thuente, Skaar & Christensen, P.A.

(57) ABSTRACT

What is provided is an observation system, comprising a modulator which comprises a two-dimensional modulator region formed by a plurality of pixels; a control unit, which is connected to the modulator and by means of which the pixels are each independently switchable into first and second conditions; intermediate imaging optics which project an object to be viewed onto the two-dimensional modulator region, wherein, of the radiation incident on the pixels due to the projection by means of the intermediate imaging optics, only that radiation which impinges on the pixels being in the first condition passes into an optical observation path.

8 Claims, 2 Drawing Sheets

OBSERVATION SYSTEM AND METHOD

This application claims priority to German Application No. 1035969.1 filed Dec. 18, 2003. Said application is incorporated by reference herein.

BACKGROUND OF THE INVENTION

The invention relates to an observation system and to an observation method wherein an object to be viewed may have additional image information superimposed thereon for a viewer.

Such superposition may be effected, for example, electronically by recording the object to be viewed by means of a camera. The image data generated by means of the camera are mixed in a computer with the image data to be superimposed and are then supplied to a viewer by means of a display. However, this has the disadvantage that direct viewing is no longer possible for the viewer. The viewer can no longer perceive his environment directly himself, which clearly affects his orientation in a disadvantageous way.

Further, optical mixing is known wherein the object to be viewed, on the one hand, and the image information to be superimposed (augmented part) from a display unit, on the other hand, are superimposed by a splitter mirror or a splitter cube, respectively. This is usually effected such that both of the images to be superimposed are located in pupil planes. Therefore, there is no topological relation of the augmented part relative to the real object. Further, superposition is effected due to there being optical transparency (by means of the splitter cube or splitter mirror, respectively) for the viewer over the entire image surface. Thus, the entire area of the augmented part is superimposed on the real scene, wherein transparency can be only indirectly adjusted by changing the brightness of the real object (for example, by means of stops) as well as of the augmented part (by varying the brightness of the display).

In view thereof, it is an object of the invention to provide an observation system and an observation method using which the possibilities of superimposing further image information on a perceivable real object are improved and made more flexible.

SUMMARY OF THE INVENTION

According to the invention, the object is achieved by an observation system comprising a modulator, which comprises a two-dimensional modulator region formed of a plurality of pixels; a control unit, which is connected to the modulator and by means of which the pixels can be made to have first and second conditions independently of each other; intermediate imaging optics which project an object to be viewed onto the two-dimensional modulator region, whereby, of the radiation impinging on the pixels due to the projection by means of the intermediate imaging optics, only that radiation impinging on the pixels being in the first condition passes into an optical observation path. This makes it possible to supply precisely defined parts of the object to the optical observation path and, thus, to the eye of the viewer. The image contents of the other areas are not supplied to the viewer and are, thus, sort of "punched out". A punched out area does, of course, represent image information as such, so that the viewer perceives the object to be viewed with the image information of the punched out area superimposed thereon.

Thus, the modulator is embodied and arranged such that only those parts of the object which are projected onto the pixels being in the first condition are perceivable by a viewer via the optical observation path.

In particular, the control unit is embodied such that it switches those pixels into the second condition that together display desired image information in the plane of the areal modulator region. Said information may be markings, such as arrows, dots, crosses or other simple figures. It is also possible to display desired contours or surfaces. The only limitation is given by the number and size of the pixels.

As the modulator, use can be made of reflective modulators, such as a tilting-mirror matrix or a reflective LCD module, or of transmissive modulators, such as a transmissive LCD module.

Further, the observation system may comprise an illumination unit, which directs illumination radiation to the two-dimensional modulator region in such a way that only that illumination radiation which impinges on the pixels being in the second condition passes into the optical observation path. Thus, the "punched out" image areas may be presented to the viewer in color. Accordingly, the arrows, for example, may be displayed in any desired color.

A particularly preferred embodiment of the observation system according to the invention consists in providing a display unit which comprises a display and display optics, said display optics projecting an image generated by means of the display onto the two-dimensional modulator region and said display unit being arranged and embodied such that, of the radiation impinging on the pixels due to the projection via the display optics, only that radiation which impinges on the pixels being in the second condition is coupled into the optical observation path. Thus, the punched out image areas can be filled with any other image information. Consequently, this has the effect that further image information for the viewer is superimposed as desired on the real object to be viewed.

Further, the control unit may be provided such that it controls each pixel in such a way that the dwell period of the pixel in the first and second conditions per time unit corresponds to predetermined values. This allows the punched out areas to be presented in a semi-transparent form to the viewer. Thus, he will see the punched out part with reduced brightness as compared to those parts of the object to be viewed which have not been punched out. This may also be used, of course, in order to display the entire object to be viewed with reduced brightness. In this case, all pixels are alternately switched into the first and second conditions. Said control also enables free adjustment of the brightness of the image reflected into punched out image sections relative to the object to be viewed.

The observation system may be provided such that the optical observation path can be inspected directly by a viewer, or such that the optical observation path has observation optics provided therein, through which the user can perceive the superimposed image adjusted via the modulator. It is thus possible to provide the desired observation system according to predetermined conditions.

For example, the observation system may be provided as a device to be worn on the user's head. Such device is also often referred to as an HMD device (Head Mounted Display device). On the other hand, the observation system can be realized in any conventional observation system in which intermediate imaging is effected. The modulator essentially just has to be suitably arranged in the intermediate image plane. Thus, the observation system can be provided, in particular, as a microscope. For example, in operations which are carried out by means of such a microscope, this enables insertion of further image contents for the surgeon into the image he can perceive, such as non-visible blood vessels and bones or the like.

The intermediate imaging optics of the observation system may also be provided as focusable or auto-focusable optics. It is further possible, if the observation system is provided as an HMD device, to provide a further unit which senses the position of the user's head and transmits these data to the control unit, which in turn controls the pixels accordingly on the basis of said data.

The object is also achieved by an observation method, which comprises projecting an object to be observed onto a two-dimensional modulator region of a modulator formed by a plurality of pixels, said pixels being independently switchable into a first and a second conditon, switching those pixels into the second condition which together represent desired image information in the plane of the two-dimensional modulator region, and directing only that radiation, of the radiation impinging on the pixels due to said projection, which impinges on the pixels being in the first condition into an optical observation path, such that those parts of the object which are projected onto the pixels being in the second condition are not perceivable by a viewer.

This method easily allows the desired superposition of images to be generated.

According to said method, illumination radiation may be further directed onto the two-dimensional modulator region in such a way that only that illumination radiation which impinges on the pixels being in the second condition passes into the optical observation path. This allows the desired image information to be displayed in color for a user.

In a particularly preferred embodiment of the observation method according to the invention, a second image is projected onto the two-dimensional modulator region in such a way that, of the radiation impinging on the pixels due to the projection of the second image, only that radiation which impinges on the pixels being in the second condition is directed into the optical observation path. Using this method, the object to be viewed can be displayed in the simplest way with any desired image information for a user by superposition.

Further, in the observation method according to the invention, the pixels may each be controlled such that their dwell period in the first and second conditions per time unit corresponds to predetermined values. This allows setting of a desired reduction or transparency, respectively, of the object to be observed.

DESCRIPTION OF THE FIGURES

Further advantages and embodiments of the invention are evident from the following description of embodiments with reference to the Figures, wherein.

DETAILED DESCRIPTION OF THE PREFERRED EMBODIMENTS

Figure 1:
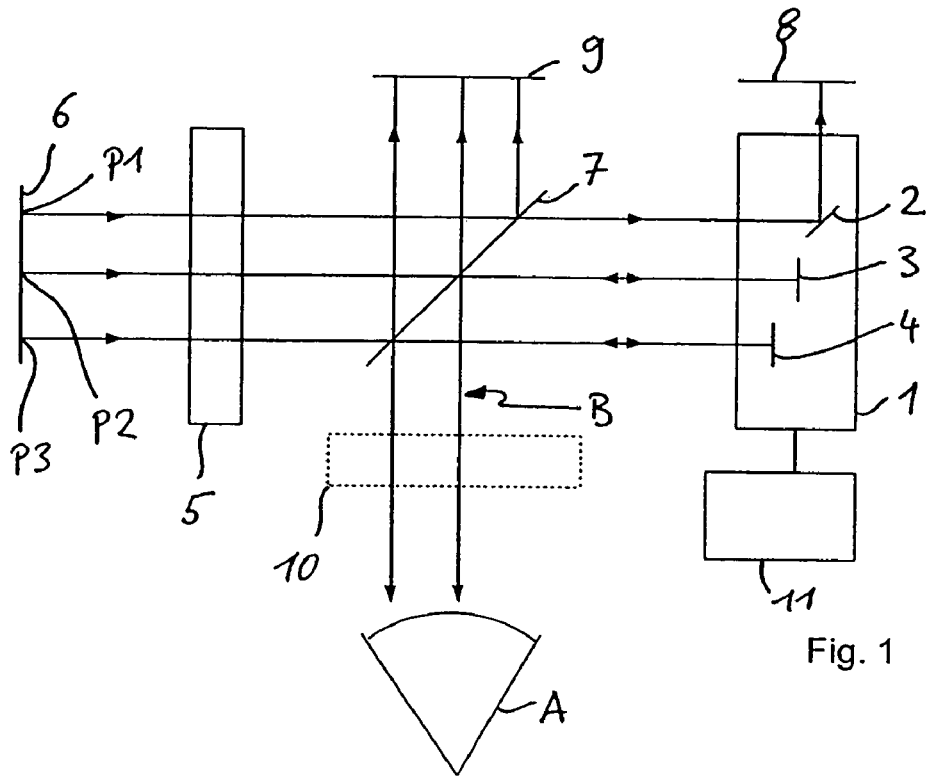
FIG. 1 shows an observation system according to a first embodiment.

FIG. 1 schematically shows a first embodiment of the observation system according to the invention. In this embodiment, the observation system comprises a modulator 1, which includes a plurality of pixels 2, 3, 4 that form a two-dimensional modulator region. In this case, the modulator is a tilting-mirror matrix, which comprises a plurality of tilting mirrors arranged in lines and columns that can each be switched into two different tilted positions. For ease of representation, only three tilting mirrors 2, 3, 4 are schematically shown in FIG. 1.

The observation system further comprises intermediate imaging optics 5, which are arranged such, relative to the two-dimensional modulator region, that they project an object 6 to be viewed onto the two-dimensional modulator region. In other words, the two-dimensional modulator region is located in the focal plane of the intermediate imaging optics 5.

Between the intermediate imaging optics 5 and the modulator 1, there is arranged a beam splitter 7, which is inclined at 45° to the optical axis of the intermediate imaging optics 5. The observation system further comprises first and second ray traps 8, 9 and may optionally include observation optics 10, which are arranged in an optical observation path B of the observation system. In this case, the optical observation path B extends from the modulator 1 via the beam splitter 7 up to a schematically shown eye A of a viewer.

There is further provided a control unit 11, by means of which the individual pixels 2, 3 and 4 can each be independently switched into the first and second conditions (i.e. the first and second tilted positions, in this case).

In order to explain the function of the observation system, the ray paths in the observation system are indicated for three points P1, P2 and P3 of the object 6 to be viewed. As can be seen from these ray paths, the object 6 (i.e. the points P1, P2 and P3) is projected onto the two-dimensional modulator region.

Of the pixels 2-4, pixels 3 and 4 are in the first condition and pixel 2 is in the second condition. The tilted position in the first condition is such that the light of the corresponding object points P2 and P3 is reflected back in itself (i.e. back to the beam splitter 6 again) and is then reflected (at least partially) to the eye A of the viewer by the beam splitter 6. The light which impinges on pixels 3 and 4 is thus coupled into the optical observation path B. In contrast thereto, the light impinging on the pixel 2, which is in the second tilted position, is deflected upwardly (in FIG. 1) to the first ray trap 8 and no longer passes into the optical observation path B. Thus, the image information on pixel 2 is not perceivable by the viewer; this part of the image is sort of "punched out". In the presently described embodiment, this area appears dark.

The modulator is now preferably controlled by means of the control unit 11 in such a way that desired image information is generated by means of the pixels that are in the second condition. Thus, for example, an arrow can be displayed as image information with the pixels which are in the second condition. Thus, using the pixels that are in the second condition, a second piece of image information is generated in the two-dimensional modulator region and, thus, in the image projected thereon, said information completely replacing the image information of the projected object 6 in this area.

The observation system may be provided, for example, as an HMD device (Head Mounted Display device), i.e. as a display device which is to be worn on the head of a user. In this case, the image information represented by the pixels that are in the second condition may serve to mark certain components for a user wearing the HMD device. One possible application is the maintenance of a machine, for example. The part to be replaced or maintained is marked by an arrow, for example, for the user looking at the machine.

However, the observation system is not restricted to HMD applications. Rather, it may be employed in all technical applications in which an object is viewed via an intermediate image. An example thereof is a microscope. Such microscope just needs to be re-fitted such that the modulator 1 is suitably arranged in the intermediate image plane. In a microscope design, the observation optics 10 will then be the eyepiece of the microscope.

Figure 2:
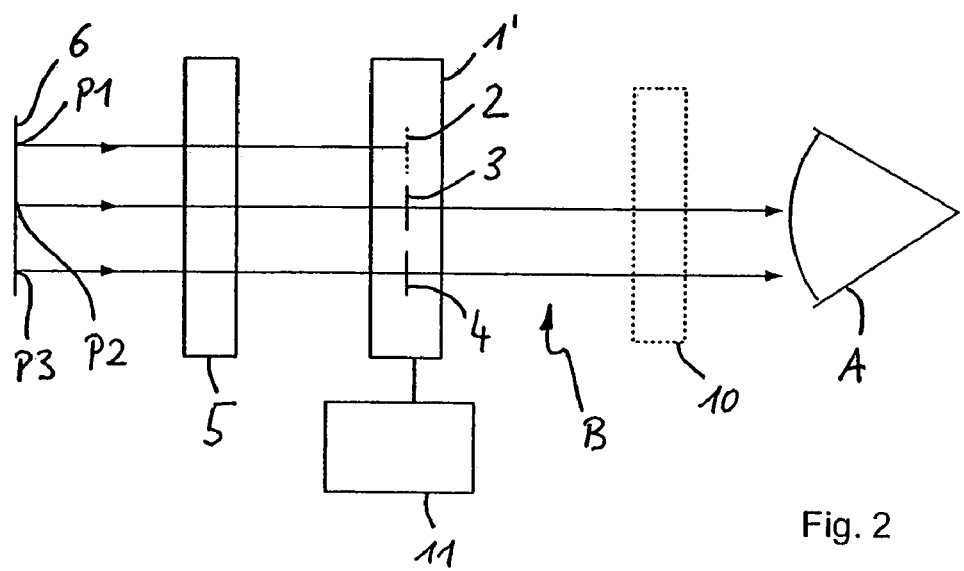
FIG. 2 shows an observation system according to a second embodiment.

FIG. 2 shows a second embodiment of the observation system according to the invention, wherein the same elements as in FIG. 1 are indicated by the same reference numerals and, for description thereof, reference is made to the above description. The embodiment shown in FIG. 2 differs from that shown in FIG. 1 in that a transmissive modulator 1' is used instead of the reflective modulator 1, said transmissive modulator 1' being in turn arranged in the focal plane of the imaging optics 5. In this case, the transmissive modulator 1' is provided, for example, as an LCD module which comprises a plurality of pixels arranged in lines and columns, of which only three pixels 2, 3 and 4 are indicated here again, by way of example. In the first condition, the pixels transmit the light incident on them, whereas in the second condition, they reflect or absorb the light incident on them. Consequently, only that light passes into the optical observation path B which comes from pixels being in the first condition. In the example schematically shown here, this applies to the pixels 3 and 4, and thus to the object points P2 and P3. The pixel 2 is in the second condition, so that the object point P1 is not perceivable by the viewer.

In the two above-described embodiments, it is also possible, of course, that the image information of the object 6 is not entirely suppressed in the desired places (here, pixel 2). Thus, the pixel 2 (or the corresponding pixels, respectively) can be switched back and forth between the first and second conditions by means of the control unit 11. In doing so, the dwell period of the pixel 2 in the first condition relative to the dwell period of the pixel 2 in the second condition (per time unit) determines how strongly the image information on the second pixel is reduced relative to the image information on the other pixels which are in the first condition. Thus, areas of the object to be viewed may be selectively displayed with reduced brightness for the viewer.

Figure 3:
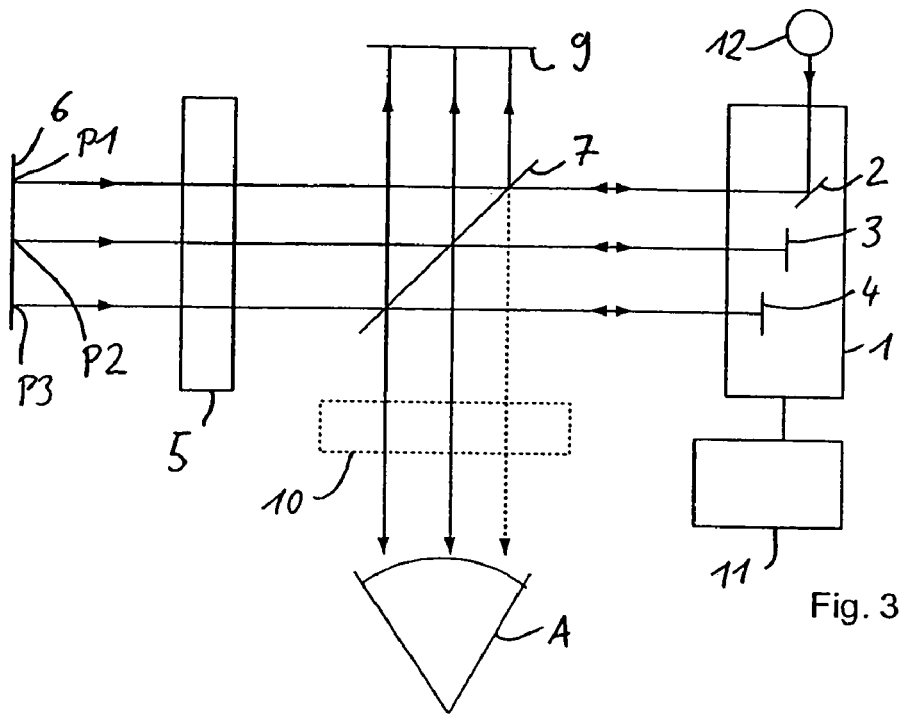
FIG. 3 shows an observation system according to a third embodiment.

FIG. 3 shows a further embodiment of the embodiment shown in FIG. 1, wherein the same parts as in FIG. 1 are referred to by the same reference numerals and their description is not repeated. The embodiment of FIG. 3 differs from that of FIG. 1 in that a light source 12 is provided instead of the first ray trap 8, said light source 12 emitting light of a predetermined color. As the light source 12, a light emitting diode may be employed, for example. The light source 12 is arranged relative to the light modulator 1 so as to illuminate the two-dimensional modulator region. However, only the light that is reflected by the pixels 2 being in the second condition is coupled into the optical observation path B, as shown by the ray path, part of which is indicated in broken lines. Thus, the area of the pixels being in the second condition is not presented dark, but in color, to the viewer. If an arrow is displayed with the pixels in the second condition and the light source 12 emits red light, said arrow is red for the viewer.

Illumination optics (not indicated) may be arranged between the light source 12 and the light modulator 1. The illumination optics are preferably provided such that their exit pupil is located on the two-dimensional modulator region. Thus, the projection of the light source 12 onto the light modulator 1 corresponds to the Köhler illumination in a microscope. This has the advantageous effect of not projecting the structure of the light source 12 onto the two-dimensional modulator region, but also of only the integral brightness component having a uniform effect at each location of the two-dimensional modulator region. Of course, the imaging optics may also be omitted, in particular if a two-dimensional light source, such as an OLED (organic light emitting diode) is used. Such a light source acts as a two-dimensional emitter, thus already resulting in a somewhat diffuse illumination. In particular, an OLED has no discernible structures, such as a spiral-wound filament in a lamp.

Figure 4:
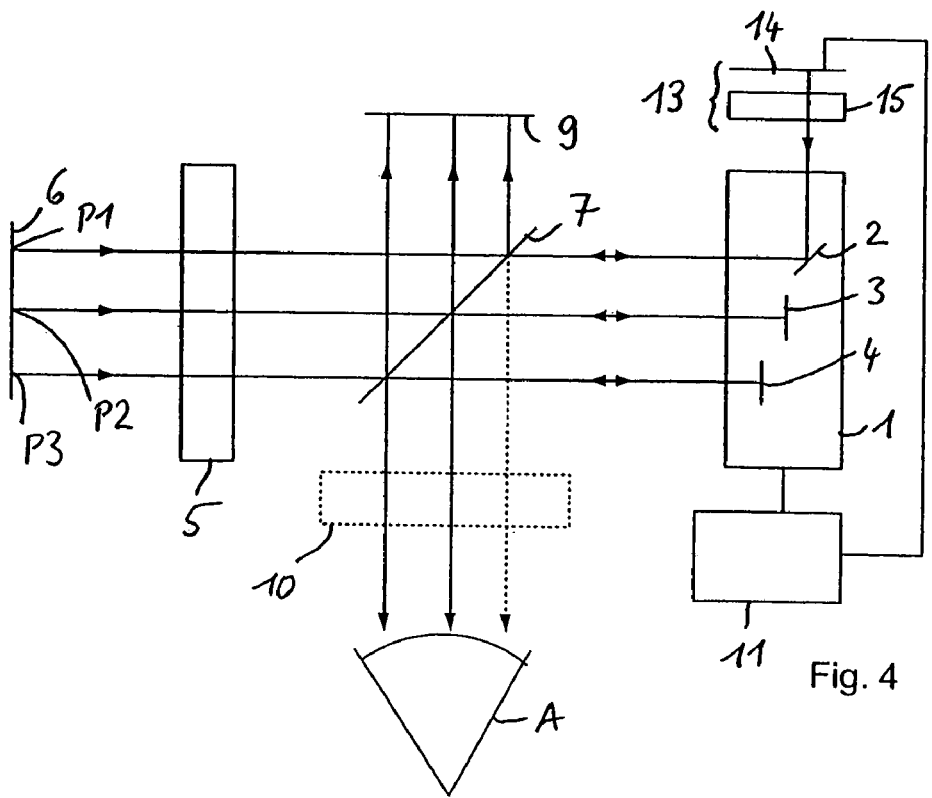
FIG. 4 shows an observation system according to a fourth embodiment.

FIG. 4 shows a still further embodiment of the embodiment shown in FIG. 1, wherein the same elements as in FIG. 1 are again referred to by the same reference numerals. The embodiment of FIG. 4 differs from that of FIG. 1 in that a display unit 13 comprising a display 14 and display optics 15 is provided instead of the first ray trap 8. The display 14 may be, for example, a luminous display or an illuminated display. The display 14 is preferably also controlled by means of the control unit 11, with the display 14 preferably being a two-dimensional display. The display 14 is projected onto the two-dimensional modulator region by means of the display optics 15. The display unit 13 is provided such and arranged relative to the modulator such that only that light coming from the display 14 and impinging on the pixels which is reflected by the pixels being in the second condition is coupled into the optical observation path B. Thus, it is possible, in the embodiment of FIG. 4, to selectively cut out parts of the object 6 to be viewed and, at the same time, to insert other image information (from the display unit 13) in said cut out parts for a viewer. Therefore, the viewer sees the further image information superimposed on the object to be viewed, said object being entirely suppressed in the area of the further image information. In other words, the image information of the object 6 which is "punched out" by means of the pixels being in the second condition is filled with other image information.

Of course, it is also possible, in the embodiments of FIGS. 3 and 4, that the image information of the object 6 may not be "punched out" completely, but displayed with reduced brightness. This is possible by suitable control of the pixels and of their dwell period in the first and second conditions. If this is applied to all pixels of the modulator, superposition of another image on the object to be viewed may be adjusted such that there is always a desired brightness ratio between the viewed object 6 and the superimposed image. If the brightness of the object 6 changes with time, one may even cause the desired brightness ratio to be retained (relatively) independently of the actual brightness of the object, by measuring the brightness of the object and by a corresponding feedback via the control unit 10. This is possible, of course, in all embodiments of the invention.

Further, it is also possible to punch out a predetermined area from the object to be viewed by means of the pixels being in the second condition and to display the further image information from the display unit 13 in said area. In this case, the resolution of the displayed image information may be higher than the resolution given by the pixels of the modulator 1. For this purpose, for example, the display 14 may have a resolution greater than the pixel size of the modulator 1, or the display 14 is projected at a reduced size onto the modulator surface F by means of the display optics 15.

In the described embodiments, the intermediate imaging optics may be further provided as focusable optics, which are preferably auto-focusable. For this purpose, known auto-focusing methods can be employed. If the observation system is provided as an HMD device, such focusing systems may likewise be employed. Further, it is also possible to continuously sense the position of the head of a user wearing the HMD device and to take it into consideration when controlling the modulator 1 and, as the case may be, the display unit 13.

In the present invention, the intermediate imaging optics 5 and the optionally provided observation optics 10 are preferably provided such that 1:1 imaging of the environment is effected for the user. Thus, the user sees the environment via the intermediate imaging optics and the optionally provided observation optics 10 in the same way as he would perceive it without the intermediate imaging optics 5 and the observation optics 10.

The observation system may be embodied such that a lateral, outward beam deflection is effected, so that, in the most extreme case, broadening of the eyebase takes effect and, thus, a somewhat exaggerated stereo display may be effected, but otherwise no limitations of the natural visual impressions are caused.

A further particularly effective embodiment of the invention consists in that the described embodiments are present separately for both eyes in an HMD device. This makes the system suitable for stereo imaging, wherein the objects to be augmented (punched out areas) are adjusted in the respective two-dimensional modulator region (for the left and the right eye) so as to cause a stereoscopic display of the punched out areas.

Thus, in a stereoscopic optical path of the type present, for example, in an HMD device or also in a microscope, genuine spatial image mixing with the object to be augmented can be effected.

In the described embodiments of the invention, a modulator is provided, which is electrically controllable and has an optically two-dimensional effect on images, and which can interlace two images in a two-dimensional manner at the resolution determined by the pixels of the modulator. Therefore, this is a system in which an input image is projected into an intermediate image on the spatial modulator and wherein the modulation or mixing, respectively, of the intermediate image with a second image having any desired form, which is preferably limited only by pixel quantization, may be effected in a two-dimensional manner.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

The invention claimed is:

1. A method of observation, comprising the steps of:
    projecting a first image of an object to be observed formed by imaging optics
    onto a two-dimensional modulator region of a modulator formed by a plurality of pixels, said pixels each being independently switchable into a first and a second condition;
    selecting a group of pixels in the plane of the two-dimensional modulator region that together display desired image information;
    switching the group of pixels into the second condition;
    directing ray paths such that a viewer can perceive the first image only via said modulator;
    directing only light from the projected object which impinges on the pixels in the first condition into an optical observation path extending from said modulator to an eye of said viewer, such that those parts of the first image which are projected onto the pixels in the second condition are not perceivable by a viewer; and
    projecting a second image onto the two-dimensional modulator region in such a way that, only a portion of the second image which is projected on the pixels in the second condition is coupled into the optical observation path.

2. The method as claimed in claim 1, further comprising the step of directing illumination light onto the two-dimensional modulator region in such a way that only illumination light which impinges on the pixels in the second condition is coupled into the optical observation path.

3. The method as claimed in claim 1, wherein each pixel is controlled such that it has a dwell period in each of the first and second conditions and the dwell period per unit time corresponds to predetermined values.

4. The method as claimed in claim 2, wherein each pixel is controlled such that it has a dwell period in each of the first and second conditions and the dwell period per unit time corresponds to predetermined values.

5. The observation method as claimed in claim 1, wherein the modulator comprises a reflective light modulator.

6. A method of observation, comprising the steps of:
    projecting a first image of an object to be observed formed by imaging optics onto a two-dimensional modulator region of a modulator formed by a plurality of pixels, said pixels each being independently switchable into a first and a second condition;
    selecting a group of pixels in the plane of the two-dimensional modulator region that together display desired image information;
    switching the group of pixels into the second condition;
    directing ray paths such that a viewer can perceive the first image only via said modulator;
    directing only light from the projected object which impinges on the pixels in the first condition into an optical observation path extending from said modulator to an eye of said viewer, such that those parts of the first image which are projected onto the pixels in the second condition are not perceivable by a viewer;
    directing illumination light onto the two-dimensional modulator region in such a way that only illumination light which impinges on the pixels in the second condition is coupled into the optical observation path; and
    wherein each pixel is controlled such that it has a dwell period in each of the first and second conditions and the dwell period per unit time corresponds to predetermined values.

7. The method as claimed in claim 1, further comprising the step of projecting a second image onto the two-dimensional modulator region in such a way that, only a portion of the second image which is projected on the pixels in the second condition is coupled into the optical observation path.

8. The method as claimed in claim 1, wherein the modulator comprises a reflective light modulator.

* * * * *